Jan. 4, 1966

W. J. WIESE 3,227,463

MECHANICAL SEAL

Original Filed Jan. 18, 1961

INVENTOR.
WINFRED JOHN WIESE

BY Joseph R. Dwyer

ATTORNEY

Jan. 4, 1966 W. J. WIESE 3,227,463
MECHANICAL SEAL
Original Filed Jan. 18, 1961
2 Sheets-Sheet 2
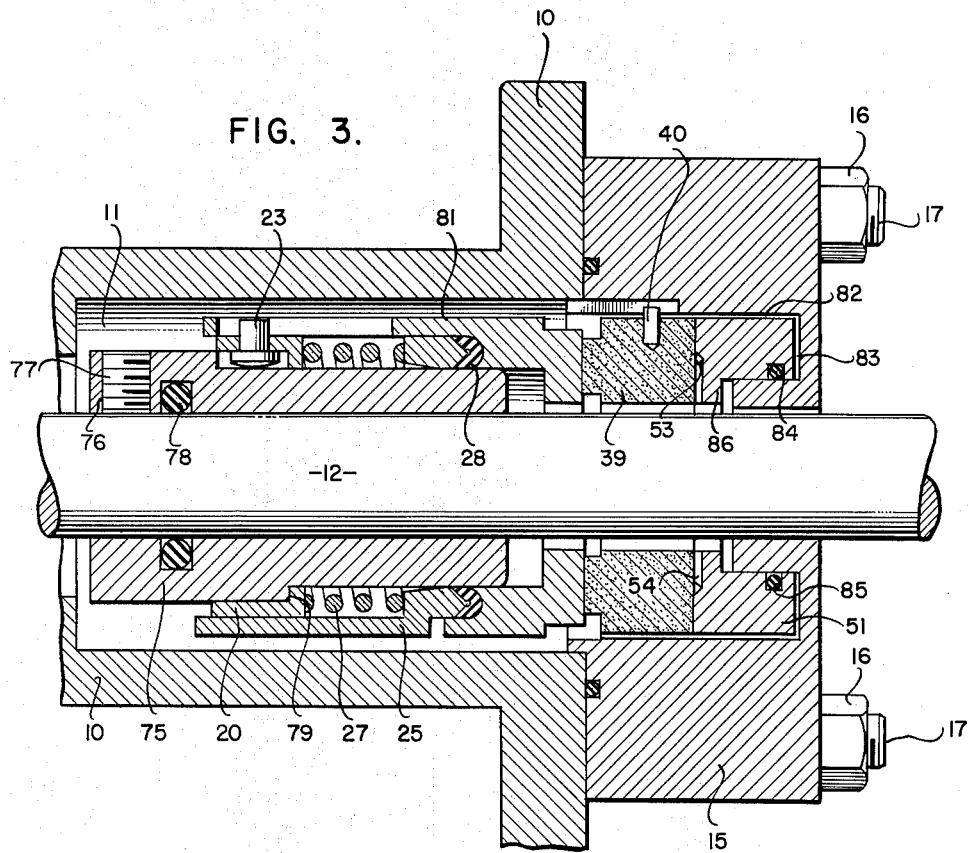
FIG. 3.
FIG. 4.
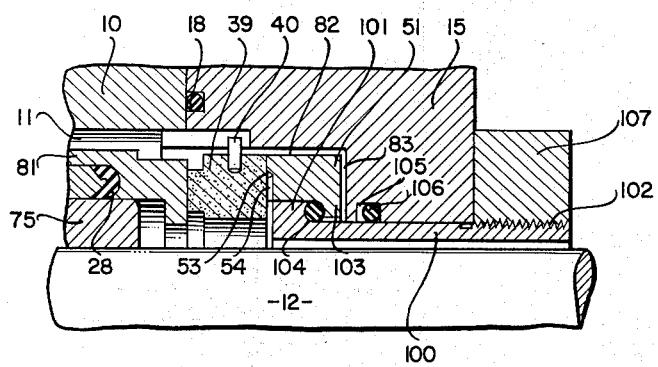
INVENTOR.
WINFRED JOHN WIESE
BY Joseph R. Dwyer
ATTORNEY United States Patent Office 3,227,463
Patented Jan. 4, 1966

3,227,463
MECHANICAL SEAL
Winfred J. Wiese, Whittier, Calif., assignor to Borg-Warner Corporation, Chicago, Ill., a corporation of Illinois
Continuation of application Ser. No. 83,476, Jan. 18, 1961. This application Oct. 14, 1964, Ser. No. 405,022
2 Claims. (Cl. 277—93)

This application is a continuing application of United States patent application filed January 18, 1961, Serial No. 83,476, entitled "Mechanical Seal," now abandoned.

The present invention relates, in general, to an improved apparatus for sealing a rotating shaft within a housing within which it rotates, and, in particular, to a new and improved mechanical seal.

In the usual mechanical seal, one or more seal members are fixedly attached to a pump shaft to rotate therewith, while other seal members are fixed to the housing of the pump, thereby affording one or more rotating seal means whose radial seal faces are in pressure relationship to the radial seal faces of the stationary seal means. Various circulating or metering devices may be used to both cool the seal means as well as to provide lubrication between the radially extending seal faces.

Mechanical seals, either of the cartridge type or otherwise, under conditions of elevated pressures and temperatures, encounter serious operating problems in that when subjected to high and varying pressures and temperatures, the sealing means tend to become warped and deformed with the resultant scoring of the radial seal faces followed by rapid seal failure.

The warping and deformation is particularly true of the seal means which is of a material more flexible than the other seal means and is subject to flexing normally either near its periphery or near the area adjacent the rotating shaft. When either of these concentrations of forces occur, localized seal wear and high friction is generated with a consequent scoring.

Thus, it is a primary object of this invention to provide a means in a mechanical seal whereby warping and distortion of the seal means of the more flexible material is prevented.

The primary object of this invention is accomplished in the embodiments disclosed herein by the provision of a backup ring disposed in back of or against the rear face of the stationary seal means which is pictorially disclosed in the seal means of more flexible material. It has been found, however, that while accomplishing the primary object of the invention, i.e., the prevention of distortion of the stationary seal means in the embodiments pictorially disclosed, another undesirable feature has been encountered. With the radially extending back face of the seal means mating with the radially extending face of the backup ring, fluid pressure will seep between the faces to by-pass the mechanical sealing faces and thus cause excessive leakage.

Accordingly, an additional object of this invention is a provision of a means preventing leakage between the more flexible seal means and the means preventing distortion of the more flexible seal means in a rotary seal.

In the specific disclosed embodiment of this invention, the means for accomplishing the last mentioned object of the invention is the provision of annular groove spaced radially inwardly from the circumference of the backup ring, which groove is vented to atmosphere by radial grooves. In this manner, the forces adjacent the peripheries of the backup ring and the more flexible seal means is greater so that the tendency of the two parts to separate is thus reduced, as will be explained in more detail hereinafter.

Other objects and advantages will become apparent from the following detailed description taken in connection with the accompanying drawings.

In the drawings:

FIGURE 3 is a cross sectional view of another embodiment of the invention; and

FIGURE 4 is a fragmentary sectional view of still another embodiment of the invention.

Figures 1, 2:
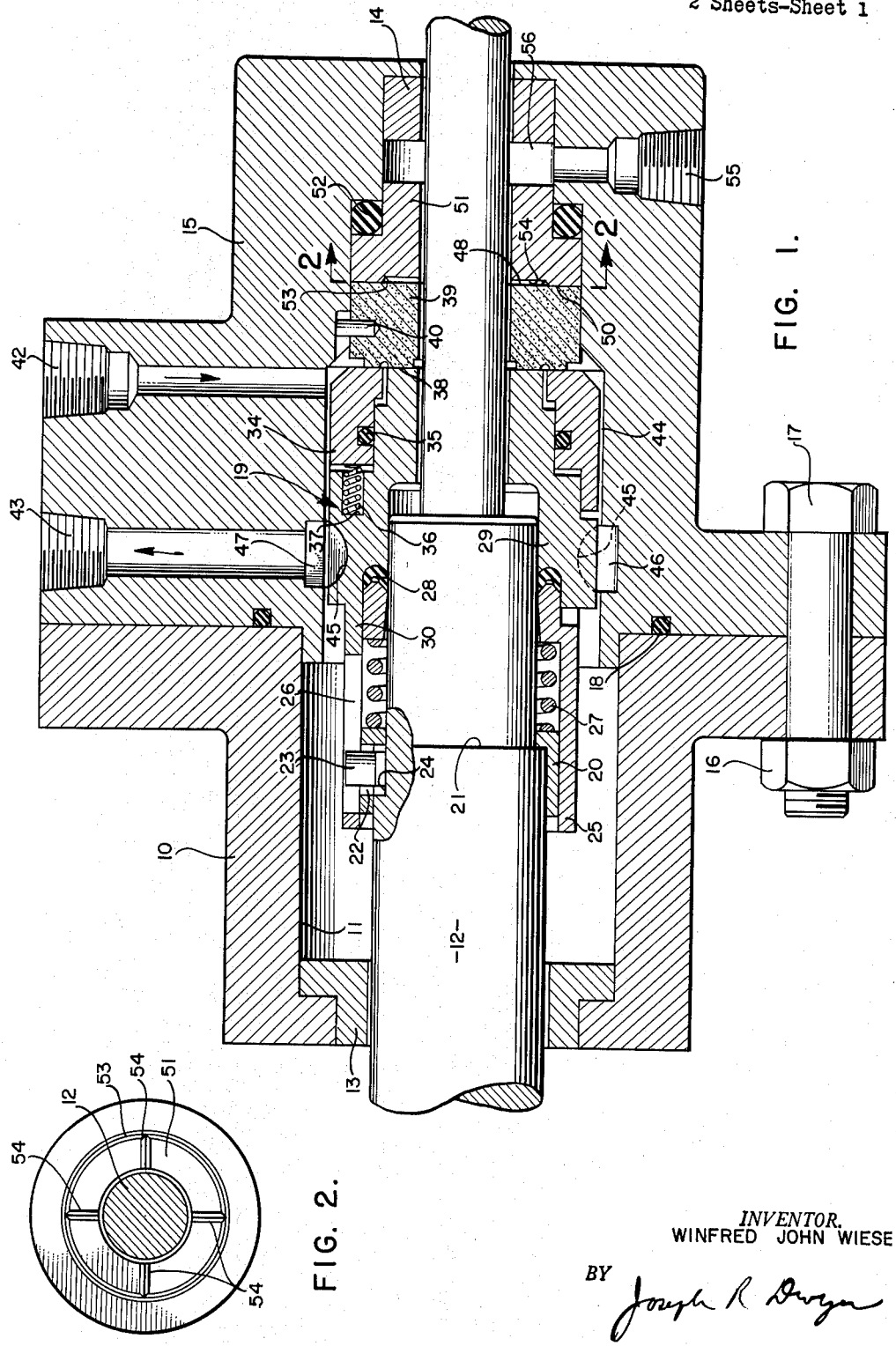
FIGURE 1 is a cross section view of one embodiment of the invention in a self-adjusting mechanical seal.
FIGURE 2 is a view taken along line 2—2 of FIGURE 1.

Referring to the drawings in which like reference characters refer to like parts, FIGURE 1 depicts a self-adjusting mechanical seal, the detailed structure and operation of which seal is more fully described and claimed in the United States Patent No. 2,930,636 issued to Herbert E. Tracy, dated March 29, 1960.

Pump housing 10 has central opening 11 extending therethrough for reception of rotatable member or shaft 12, journaled through throttle bushings 13 and 14 at each end thereof. A detachable flange or end member 15 is secured to the pump housing 10 by any suitable means such as nuts and bolts 16 and 17 and sealed against leakage by O-ring seal 18. Although the pump housing 10 is illustrated with flange member 15, detachably secured thereto, it is to be understood that pump housing 10 may be a unitary structure. A rotatable mechanical seal, generally designated 19, encircles shaft 12 and is secured thereto as hereinafter described.

A cup shaped seal drive member 20 encircles shaft 12 abutting against shoulder 21 of said shaft. Cup member 20 has a pair of diametrically opposed slots 22, only one of which is shown, to each receive a pin 23 which projects into counter bore 24 in shaft 12 whereby cup member 20 is drivingly engaged to said shaft. Spring holder 25 overrides or telescopes over cup member 20, and the pins 23 extend radially into a pair of slots 26 (not shown) in spring holder 25. Slots 26 are closed at one end, respectively, as illustrated in FIGURE 1, so that when spring 27 urges spring holder 25 to the right, the spring holder cannot become disengaged from pins 23. In this manner the parts remain in their assembled position. Spring holder 25 normally abuts against a U-shaped resilient sealing element 28 which prevents the leakage of fluid between the spring holder 25 and shaft 12. Spring 27 also urges said spring holder 25 together with resilient sealing element 28 against a primary rotating seal element 29. Primary seal element 29 is drivingly connected to spring holder 25 by means of ears 30, only one of which is shown, which are received in previously described axially extending slots 26 of spring holder 25.

A secondary rotatable seal element 34 is provided which telescopes over and is sealingly engaged to primary seal element 29 by resilient O-ring 35. A plurality of springs 36, only one of which is shown, retained within counter-bores 37 in primary seal member 29, urge secondary sealing element 34 into engagement with a radially extending face 38 of nonrotatable or stationary seal means 39. Seal member 39 is secured against rotation by means of pin 40 extending both into flange 15 and out into the seal member. Seal member 39 is preferably fashioned of carbon or a soft metal, such as bronze, whereas seal members 29 and 34 are preferably fashioned of a relatively hard metal, such as Stellite.

Inlet and outlet ports 42 and 43, respectively, are formed in flange 15 so that cooling and lubricating fluid may be introduced. Coolant so introduced into ports 42 passes through the communication channel 44 to outlet port 43, thence to a heat exchanger, not shown, and back to inlet 42. In order that the coolant may be circulated, rotating member 29 is formed so as to act as a secondary impeller.

A series of transverse concave depressions 45 are formed in the periphery of rotating member 29, and as the rotating member 29 turns, fluid will be impelled around annular pressure chamber 46 formed in flange 15 immediately adjacent said transverse depressions 45. A metallic deflection piece 47 is welded across the annular pressure chamber 46 at one side of the intersection of chamber 46 and outlet passage 43. When the fluid strikes deflection piece 47 it is diverted outwardly through outlet passage 43.

Nonrotatable seal means 39 has a radially extending face 48 which is in pressure engagement with radially extending face 50 of rigid backup ring 51. In this embodiment, a resilient O-ring 52 is provided to prevent leakage between the backup ring 51 and flange 15; however, backup ring 51 may be lapped on at least a portion of one surface of said ring to the mating portion of said flange or pump housing to prevent leakage therebetween, thus eliminating O-ring 52.

Ring 51 is also provided with an annular groove 53 on the radial surface which engages stationary seal 39. This groove 53 is spaced from the outer periphery of the ring 51 and has a plurality of radially extending grooves 54 communicating therewith and with the periphery of shaft 12 to vent said annular groove to atmosphere. Drain port 55, communicating with annular chamber 56, is provided for removal of any fluid to atmosphere which has leaked from the mechanical seal faces along the periphery of shaft 12.

As previously mentioned, it has been found that the ordinary mechanical seal while able to operate efficiently under low pressures, if fluid pressures become excessive, the seal members tend to warp, thus causing excessive seal wear and scoring with consequent seal failure.

With the nonrotatable seal member 39 rigidly supported across its radially extending face 48 by backup ring 51, the distortion and warping of said ring and consequent seal failure is prevented.

As also previously mentioned, it has been found that if the radially extending face 50 of ring means 51 is a flat unrelieved surface, fluid under pressure will seep across the mating faces 48 and 50 causing excessive leakage of fluid with the possibility of opening said engaged faces 48 and 50, by-passing the sealing effect of the mechanical seal assembly. This undesirable effect has been overcome by providing the annular groove 53 in the radial face 50, and by interconnecting it by radially extending grooves 54 to vent said groove 53 to atmosphere along the axis of shaft 12. In this manner, the pressure drop across the coengaged faces of seal means 39 and ring 51 from fluid pressure is between the periphery of seal means 39 and ring means 51 and the annular groove 53. Inasmuch as the surface areas under fluid pressure are less or substantially less, it is apparent that the coengaged radial faces between the groove 53 and the peripheries of said rings 51 and 39 will be subject to a high unit load from the annular groove 53 outwardly by reason of the forces acting on the seal face 38 of stationary ring 39. Because the unit load is greater than the pressure drop across said faces tending to urge said faces apart, no leakage will occur across said two faces 48 and 50, under operating conditions.

Inasmuch as ring 51 comprises a rigid material such as stainless steel, sealing means 39 will be supported across its entire face 48 in a manner to prevent its warping under high pressures from the area between annular groove 53 and the periphery of sealing means 39. Because of the rigidity of back-up ring 51, the inner radial face of seal means 39 from said annular groove 53 to the shaft surrounding circumference of said ring is rigidly supported against warping resulting from fluid pump housing pressures exerted against the shaft surrounding portion of ring 39.

FIGURES 3 and 4 illustrate two additional embodiments of the invention as a combination of or a part of other types of mechanical seals.

Referring to FIGURE 3, shaft 12 is provided with a sleeve 75 and a counter bore 76 for reception of lock pin 77 to drivingly connect said sleeve to said shaft. A resilient O-ring 78 is provided to prevent leakage between sleeve 75 and shaft 12 so unit fluid from chamber 11 will not flow along said shaft. Sleeve 75 has shoulder 79 which serves the same function as shoulder 21 in FIGURE 1, i.e., to prevent spring 27 from separating the parts and seal drive member 20 is drivingly connected to sleeve 75 by means of pins 23 in the same manner that seal drive 20 is connected to shaft 12 in FIGURE 1. Spring holder 25 surrounding seal drive member 20 and enclosing spring 27, is provided to urge said spring holder 25 and resilient U-sealing element 28 to the right into sealing engagement with rotating seal means 81. The latter is drivingly connected to spring holder 25 in the same manner previously described in connection with FIGURE 1. Nonrotatable seal means 39 is secured to flange 15 by means of pin 40, and an axially extending annular channel 82 communicates at one end with housing opening 11 and at its other end with radially extending pressure chamber 83 formed by the flange 15 and the back face of backup ring. Resilient O-ring 84 is received in annular groove 85 of ring means 51 to seal said ring within the interior of flange 15.

By means of channel 82 and pressure chamber 83, backup ring 51 is urged into engagement with radially extending surface of non-rotatable seal means 39 under full fluid pressure and because backup means 51 has annular groove 53 and interconnected radially extending grooves 54 on one radially extended surface thereof, the same operating conditions described in connection with FIGURE 1 exist. It is to be noted, however, that while most of non rotatable seal means 39 are supported by ring 51 under full pressure in pressure chamber 83, and thus gives the necessary sealing effect between the groove 53 to the outer peripheries of seal means 39 and ring 51, in addition, the inwardly extending shoulder 86 of ring 51 supports nonrotatable seal means 39 to prevent any distortion near the shaft.

Referring to FIGURE 4, the right end of shaft 12 is journaled in sleeve member 100 having a lip 101 at its inner end and threads 102 at its outer end. Backup ring means 51 is provided with an annular lip 103 which, in cooperation with lip 101, provides an annular channel to receive sealing O-ring 104 to prevent leakage between ring 51 and sleeve 100. Flange 15 is provided with an annular groove 105 to receive annular sealing O-ring 106 to prevent leakage beween the flange 15 and sleeve member 100. Lock ring 107 threadedly engages sleeve 100 to properly position sleeve 100 and backup ring 51 within flange 15.

This embodiment is an apparent function like the embodiment shown in FIGURE 3, but provides, in addition, more support near the shaft for the stationary seal member 39 by reason of the sleeve 100.

Although, in the embodiments disclosed herein, annular groove 53 and interconnecting radial grooves 54 are shown to be in the face of backup ring 51, it is apparent that said annular groove and said radially extending grooves may be in the radially extending face of the non-rotatable seal 39 to function equally as well. It is also apparent that such a backup ring may be used in all types of mechanical seals whether said seals have a single or a plurality of rotatable seal members, and while the venting of grooves 53 and 54 has been to atmosphere, such venting could be to any zone of lower pressure than the pressure in the housing chamber 11.

While the above description of the invention has been in connection with the more flexible sealing means 39 being nonrotatable, the invention should not be so limited since in some applications it may be desirable that the more flexible sealing means 39 be the rotatable sealing means. In this case, the member 51, which has functioned as a backup ring, would then form the stationary sealing means and would, of course, have a relatively flat surface without the annular groove 53 and the radial grooves 54 to sealingly engage the rotating seal means 39. The previously described rotating seal means 81 would then function as a backup ring and its heretofore described seal face would then be formed with the annular groove 53 and radial grooves 54 to reduce the leakage and provide higher unit load near the outer periphery so as to function identically as the previously described backup ring 51.

Various changes may be made from the forms herein disclosed without departing from the terms and concepts of the invention. Such changes will be apparent to those skilled in the art, but will be found to be within the scope of the following claims.

I claim:

1. A rotary seal to prevent leakage of fluid under pressure from between relatively rotatable parts comprising a housing, a rotatable shaft within said housing, a rotatable seal member surrounding said shaft adapted to rotate therewith, a non-rotatable seal member being supported by said housing in a manner such that radial outward movement and rotary movement of said non-rotatable seal member with respect to said housing is restricted and in a manner such that said non-rotatable seal member is free to shift axially with respect to said housing, said non-rotatable sealing member having a radially disposed sealing surface and a radially disposed backup surface, said non-rotatable sealing member being of a material more flexible than said rotatable sealing member, said rotatable sealing member having a radially disposed surface adapted to engage said radially disposed sealing surface on said non-rotatable sealing member, means for preventing distortion of said non-rotatable sealing member comprising a backup ring having a surface in pressure co-planar engagement with said radially disposed back-up surface throughout the radial extent thereof, means for increasing the unit load exerted by said back-up ring on said non-rotatable sealing member whereby the co-planar relationship between the back-up ring and the non-rotatable sealing member remains substantially constant and the non-rotatable sealing member is supported by an area substantially equal to the area of said back-up surface.

2. A rotary seal to prevent leakage of fluid under pressure from between relatively rotatable parts comprising a housing having a bore therein, axially extending slots formed in said bore, a shaft rotatably supported within said housing, a rotatable seal member carried by said shaft adapted to rotate therewith, a non-rotatable seal member being supported by said housing in said bore, a plurality of radially extending pins carried by said non-rotatable member operatively positioned in said axially extending slots, said non-rotatable sealing member having a radially disposed sealing surface, a radially disposed back-up surface and a central bore of a diameter in excess of the diameter of said shaft to provide an annular space therebetween, said non-rotatable sealing member being of a material more flexible than said rotatable sealing member, said rotatable sealing member having a radially disposed sealing surface adapted to engage said radially disposed sealing surface of said non-rotatable sealing means, means for preventing distortion of said non-rotatable sealing member comprising a back-up ring having a surface in pressure coplanar engagement with said radially disposed back-up surface and a central bore of a diameter in excess of the diameter of said shaft to provide an annular space therebetween, means to vent the fluid between said non-rotatable sealing member and said back-up ring to atmosphere including a relief groove formed between said back-up surface and said back-up ring, said relief groove providing communication to said annular space between said back-up ring and said shaft, and vent means in communication with said annular space.

References Cited by the Examiner

UNITED STATES PATENTS

| | | | |
|---|---|---|---|
| 1,876,520 | 9/1932 | Newkirk et al. | 277—22 |
| 2,797,940 | 7/1957 | Michener et al. | 277—91 |
| 2,824,759 | 2/1958 | Tracy | 277—87 |
| 2,835,515 | 5/1958 | Solari | 277—92 |
| 2,836,440 | 5/1958 | Brumagin | 277—68 |
| 2,921,806 | 1/1960 | Carter | 277—65 |
| 2,963,306 | 12/1960 | Tracy | 277—68 |
| 2,971,784 | 2/1961 | Tracy | 277—93 X |

LAVERNE D. GEIGER, *Primary Examiner.*

SAMUEL ROTHBERG, *Examiner.*